Jan. 3, 1928.

D. H. MONTGOMERY 1,654,696

AUTOMOBILE HEADLIGHT AND CONTROL THEREFOR

Original Filed Dec. 15, 1921   2 Sheets-Sheet 1

INVENTOR.
Don H. Montgomery
BY
ATTORNEY.

Jan. 3, 1928.

D. H. MONTGOMERY 1,654,696

AUTOMOBILE HEADLIGHT AND CONTROL THEREFOR

Original Filed Dec. 15, 1921   2 Sheets-Sheet 2

INVENTOR.
BY
ATTORNEY.

Patented Jan. 3, 1928.

1,654,696

UNITED STATES PATENT OFFICE.

DONN H. MONTGOMERY, OF DENVER, COLORADO.

AUTOMOBILE HEADLIGHT AND CONTROL THEREFOR.

Application filed December 15, 1921, Serial No. 522,725. Renewed June 18, 1927.

My invention relates to headlights for motor driven vehicles and its principal object resides in providing in a headlight of the type generally used on automobiles, means adapted to prevent the emission of upwardly directed light rays without diminishing the efficiency of the device.

A further object resides in providing a simple adjustment by which the driver of the vehicle may change the direction of the light beam emitted from the headlight, in order to illuminate the road at the desired distance ahead of the vehicle, on inclines as well as on a level ground, and still another aim of the invention is to provide a headlight of high illuminative power, in which the source of light is concealed so as to be invisible at the front of the same.

By the use of my invention, the glare produced by the direct or primary light rays issuing from the lamp of the headlight through the glass covered front thereof and the reflected or secondary rays which emerge from the parabolic reflector, is completely eliminated with the result that accidents frequently occurring by the blinding effect of the glare on pedestrians and drivers of approaching vehicles, is avoided.

With the above and other objects in view, my invention resides in the novel features of construction, formation, combination and arrangement of parts to be hereinafter more fully described with reference to the accompanying drawings in the several views of which like parts are similarly designated and in which Figure 1 is a side elevation of an automobile equipped with the device;

Figure 1:
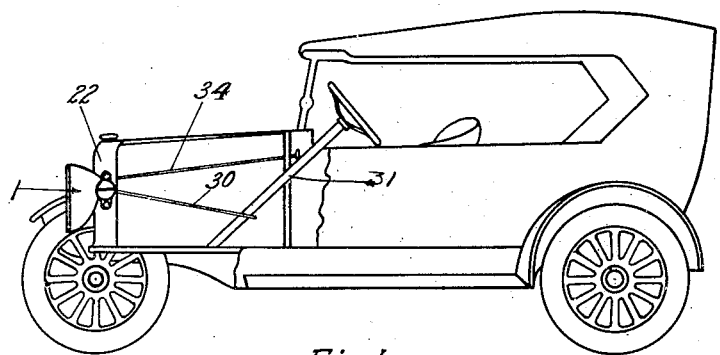
Figure 2:
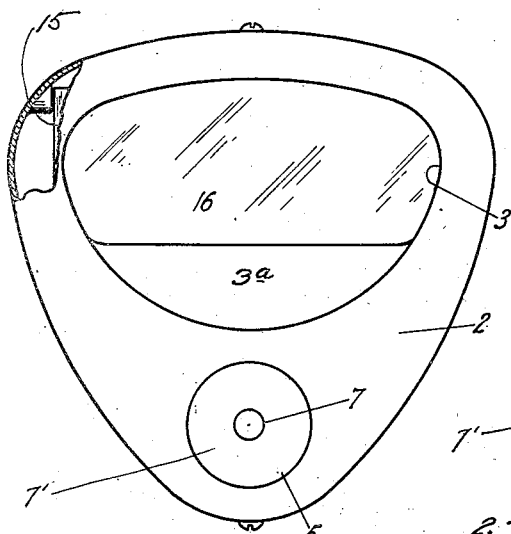
Figure 2 is a front elevation of the left hand headlight, partly in section.

Referring to the drawings, 1 designates a lamp casing the front of which is closed by a plate 2 of opaque material, provided with two light-openings 3 and 5, formed one above the other.

The lower opening which is much smaller than the other, is closed by a glass panel 7' and it is, interiorly of the casing, covered by a housing 6 which has a reflective inner surface and which encloses a small incandescent lamp 7. Arranged interiorly of the casing in opposition to the opening 3 is a lens support 4ª diverging inwardly from the casing from the top to the bottom thereof. This lens support is connected with the casing by a web 3ª which functions as a baffle to prevent light rays emanating from a lamp 10 in the bottom portion of the casing from passing directly through the opening 3 or through the lens panel 4 carried by the lens support 4ª.

The hereinbefore mentioned lamp 10 is mounted in a socket 9 on a base 8 in the bottom portion of the casing, and placed immediately above the lamp and axially in alinement therewith and immediately adjacent the rear edge of the adjacent portion of the web 3ª is an open-ended tube 12 which by means of a bracket 11 is rigidly fastened to the casing. The tube is interiorly screwthreaded for the adjustable support of the circular frame 13 of a condensing lens 14.

Mounted above the tube 12 and opposite to the opening 3 in the front of the casing, is a slanting reflector preferably composed of a mirror 16 set in a frame 15. The tube 12 occupies the greater part of the space between the web 3ª at the lower portion thereof, and the wall of the casing so that the majority of the light rays emanating from the lamp pass through the tube into the upper portion of the casing and onto the slanting mirror which reflects the rays in a forward and downward direction through the opening 3 in the front of the casing.

It will be evident that owing to the slanting position of the mirror no rays of light passing through the opening 3 are reflected in an upward direction and the entire light beam produced in the operation of the lamp, is directed toward the road ahead of the vehicle to which the lamp is applied.

The lens 14 in the tube focuses the light onto the mirror in a beam of restricted area, and any light rays passing from the lamp exteriorly of the tube are prevented from passing upwardly through the opening 3 by the web 3ª.

Figure 4:
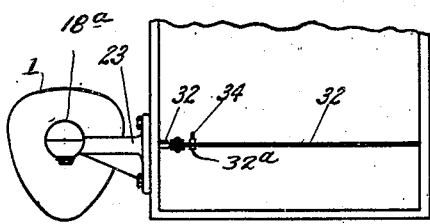
Figure 4 is a rear elevation of the lamps.

The casing 1 has a recessed hemi-spherical head 18ª which in practice is supported upon and secured to the correspondingly shaped end of a correspondingly recessed bracket 23 which is fixed at the front of the automobile as shown in Figure 4.

Figure 3:
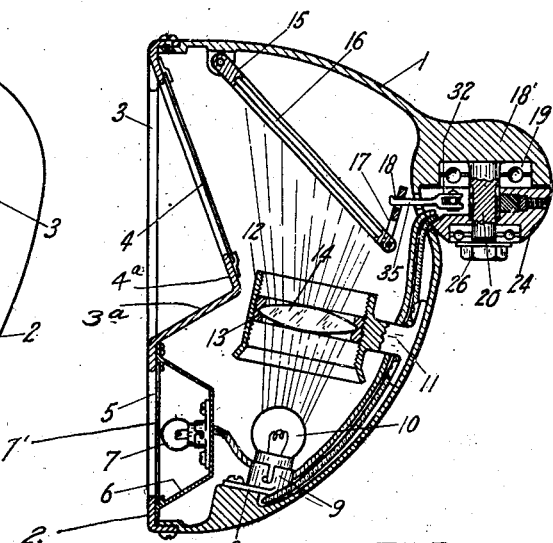
Figure 3 is a vertical central sectional view through the same.
Figure 5:
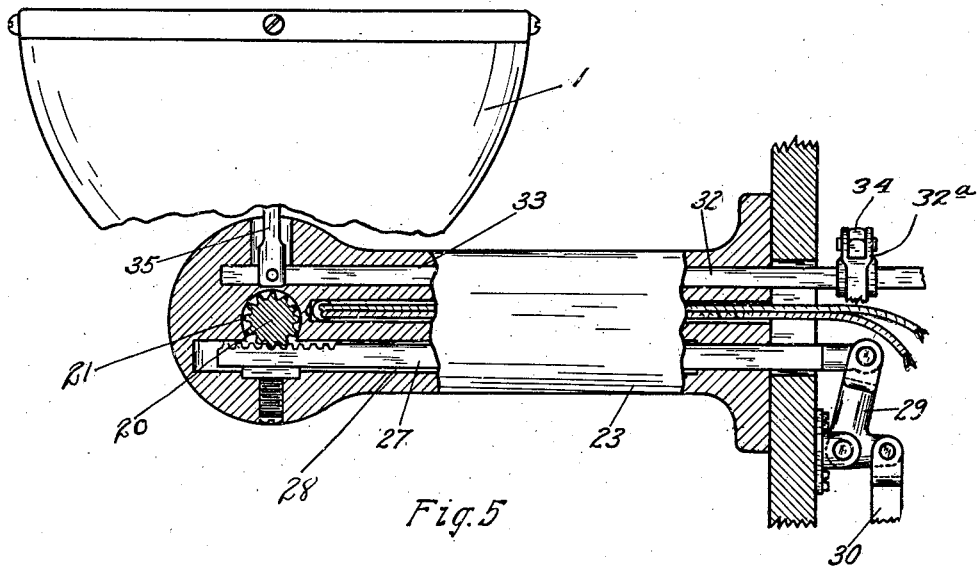
Figure 5 is a plan view of one of the bracket arms, partly in section.
Figure 6:
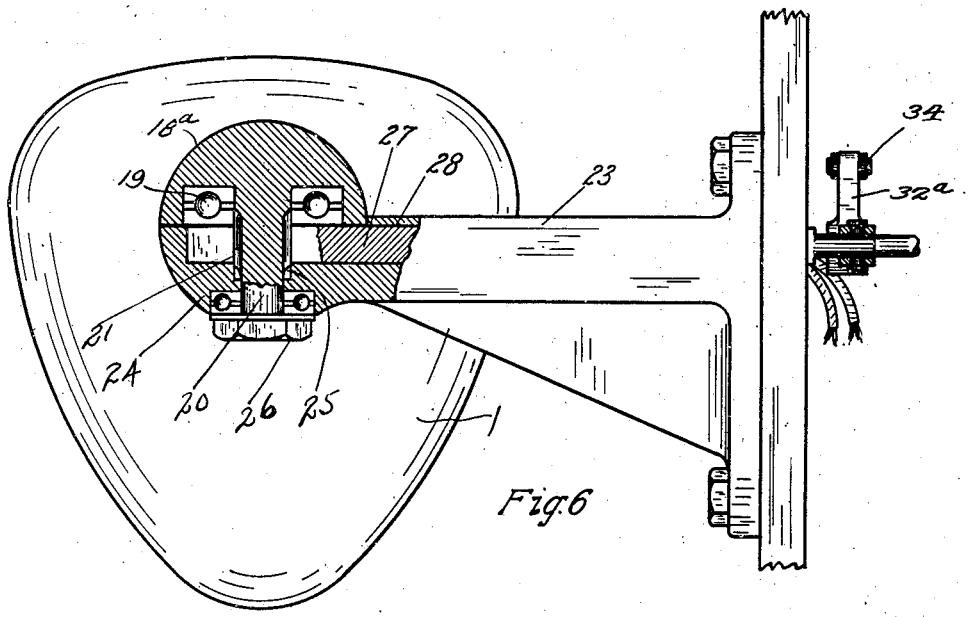
Figure 6 is a rear elevation of the same, partly in section.

It is preferred to mount at least one of the headlights so that it may rotate in conjunction with a part of the steering gear of the vehicle in order to constantly throw its light beam in the direction in which the vehicle travels, and to accomplish this movement, roller bearings are provided as shown at 19 in Figure 3, and a shaft 20 on the head of the casing, extending through the end of the bracket, is connected with a suitable mechanism such as the pinion 21, the rack bar 27 slidable in a passage 28, the bell crank 29 and the rod 30, shown in Figure 5, to effect the rotation of the headlight by movement of the steering post 31.

Inasmuch as the present application is restricted to the construction of the headlight per se no further explanation of its dirigible features is required.

In order to change the direction of the light beam emitted through the opening 3 of the headlight according to the degree of inclination of the road ahead of the automobile, the frame of the mirror 16 is pivotally mounted at its upper end and its opposite end is connected with a mechanism by means of which the angle of inclination of the reflector can be varied by an occupant of the driver's seat of the vehicle.

The mechanism above referred to comprises a link 17 longitudinally slotted as at 18, and pivotally attached at the lower end of the frame 15 of the mirror 16. A shaft 32 rotatably mounted in a bore of the horizontal bracket arm 23, has a laterally projecting arm 35 which loosely engages in the slot of the link 17 so that by a partial rotation of the shaft, the link may be raised or lowered and thereby move the mirror frame about its pivotal axis.

The two shafts extending through the bracket arms of the two headlights are axially alined and they are connected by a coupling 32ª shown in Figures 4 and 5, which has a crank arm in connection with an operating rod 34 extending rearwardly of the shafts within easy reach of the driver of the vehicle.

It will be apparent that the rod 34 must be positioned at one side of the vehicle in order to place its end in adjacency to the driver's seat and that in consequence, the shafts 32 of the two headlights are of unequal lengths.

What I claim and desire to secure by Letters Patent is:

In a headlight, a casing including a front cover having an opening in the upper portion thereof and a lens support positioned within the casing in opposition to the opening and diverging inwardly from the casing toward the lower edge of the opening, the casing cover having a web connecting the lens support and cover at the sides and bottom of said opening, a lamp within the bottom of the casing and screened from said lens by said web, an inclined reflector pivoted in said casing to the rear of said lens support, a tube supported in said casing immediately above the lamp and adjacent the rear edge of the web, said tube directing rays from said lamp to said reflector, a condensing lens adjustable within the tube and means for adjusting the angle of the reflector to said lens support.

In testimony whereof I have hereunto set my hand.

DONN H. MONTGOMERY.